(12) United States Patent
Rajamani et al.

(10) Patent No.: US 10,789,131 B2
(45) Date of Patent: Sep. 29, 2020

(54) TRANSPORTABLE BACKUPS FOR PLUGGABLE DATABASE RELOCATION

(71) Applicant: Oracle International Corporation, Redwood Shores, CA (US)

(72) Inventors: Kumar Rajamani, San Ramon, CA (US); Muthu Olagappan, Belmont, CA (US); Yunrui Li, Fremont, CA (US); Giridhar Ravipati, Foster City, CA (US); Jing Zheng, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/254,884

(22) Filed: Sep. 1, 2016

(65) Prior Publication Data

US 2018/0060181 A1    Mar. 1, 2018
US 2020/0026609 A9    Jan. 23, 2020

Related U.S. Application Data

(60) Provisional application No. 62/245,937, filed on Oct. 23, 2015.

(51) Int. Cl.
*G06F 11/14* (2006.01)
*G06F 16/27* (2019.01)

(52) U.S. Cl.
CPC ...... *G06F 11/1451* (2013.01); *G06F 11/1469* (2013.01); *G06F 11/1471* (2013.01);
(Continued)

(58) Field of Classification Search
CPC combination set(s) only.
See application file for complete search history.

(56) References Cited

U.S. PATENT DOCUMENTS 6,185,699 B1    2/2001 Haderle
6,205,449 B1    3/2001 Rastogi
(Continued)

FOREIGN PATENT DOCUMENTS

CN    104951425 A    9/2015

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.
(Continued)

*Primary Examiner* — Shyue Jiunn Hwa
(74) *Attorney, Agent, or Firm* — Hickman Palermo Becker Bingham LLP (57) ABSTRACT

Techniques are provided for creating a backup of a source pluggable database (SPD) of a source container database and porting the backup for recovery into a different target container database. In an embodiment, a source database server retrieves metadata that describes backups of the SPD. The source database server inserts, into an unplugged pluggable database of the SPD, the metadata that describes each of the backups. For example, unplugging the SPD may automatically create the unplugged pluggable database. Eventually, the unplugged pluggable database may be plugged into the target container database. A target database server transfers the metadata that describes each of the backups from the unplugged pluggable database and into the target container database. Based on at least one backup and the metadata that describes backups of the SPD, the target database server restores a target pluggable database within the target container database.

21 Claims, 5 Drawing Sheets

(52) U.S. Cl.
CPC .......... *G06F 16/27* (2019.01); *G06F 2201/80* (2013.01); *G06F 2201/805* (2013.01); *G06F 2201/82* (2013.01)

(56) References Cited

U.S. PATENT DOCUMENTS

| | | | |
|---|---|---|---|
| 6,226,650 B1 | 5/2001 | Mahajan | |
| 6,295,610 B1 | 9/2001 | Ganesh | |
| 6,502,102 B1 | 12/2002 | Haswell | |
| 6,633,878 B1 | 10/2003 | Underwood | |
| 6,638,878 B2 | 10/2003 | Restaino | |
| 6,804,671 B1 | 10/2004 | Loaiza et al. | |
| 6,973,647 B2 | 12/2005 | Crudele | |
| 6,983,295 B1 | 1/2006 | Hart | |
| 7,136,857 B2 | 11/2006 | Chen | |
| 7,305,421 B2 | 12/2007 | Cha | |
| 7,366,713 B2 | 4/2008 | Kaluskar | |
| 7,406,515 B1 | 7/2008 | Joyce | |
| 7,418,435 B1 | 8/2008 | Sedlar | |
| 7,571,173 B2 | 8/2009 | Yang | |
| 7,620,620 B1 | 11/2009 | Sedlar | |
| 7,620,623 B2 | 11/2009 | Sedlar | |
| 7,634,477 B2 | 12/2009 | Hinshaw | |
| 7,822,717 B2 | 10/2010 | Kappor et al. | |
| 8,065,320 B2 | 11/2011 | Sedlar | |
| 8,117,174 B2 | 2/2012 | Shaughessey | |
| 8,161,085 B2 | 4/2012 | Souder | |
| 8,335,767 B2 | 12/2012 | Das et al. | |
| 8,364,648 B1 | 1/2013 | Sim-Tang | |
| 8,478,718 B1 | 7/2013 | Ranade | |
| 8,554,762 B1 | 10/2013 | O'Neill | |
| 8,600,977 B2 | 12/2013 | Dageville et al. | |
| 9,026,679 B1 | 5/2015 | Shmuylovich | |
| 9,189,522 B2 | 11/2015 | Das et al. | |
| 9,280,591 B1* | 3/2016 | Kharatishvili | G06F 17/30575 |
| 9,298,564 B2 | 3/2016 | Lee | |
| 9,390,120 B1 | 7/2016 | Gulliver | |
| 9,396,220 B2 | 7/2016 | Li | |
| 9,507,843 B1* | 11/2016 | Madhavarapu | G06F 17/30575 |
| 9,684,561 B1* | 6/2017 | Yan | G06F 11/1412 |
| 2002/0112022 A1 | 8/2002 | Kazar et al. | |
| 2002/0143733 A1 | 10/2002 | Mukkamalla | |
| 2003/0061537 A1 | 3/2003 | Cha et al. | |
| 2003/0074360 A1 | 4/2003 | Chen | |
| 2003/0154236 A1 | 8/2003 | Dar | |
| 2004/0024888 A1 | 2/2004 | Davis | |
| 2004/0039962 A1 | 2/2004 | Ganesh | |
| 2004/0054643 A1 | 3/2004 | Vermuri | |
| 2004/0054644 A1 | 3/2004 | Ganesh | |
| 2004/0177099 A1 | 9/2004 | Ganesh | |
| 2004/0186826 A1 | 9/2004 | Choi | |
| 2004/0210577 A1 | 10/2004 | Kundu | |
| 2004/0267809 A1 | 12/2004 | East et al. | |
| 2005/0038831 A1 | 2/2005 | Souder et al. | |
| 2005/0256908 A1 | 11/2005 | Yang | |
| 2005/0283478 A1* | 12/2005 | Choi | H04L 67/02 |
| 2006/0047626 A1* | 3/2006 | Raheem | G06F 11/1469 |
| 2006/0047713 A1* | 3/2006 | Gornshtein | G06F 17/30575 |
| 2006/0179042 A1 | 8/2006 | Bram | |
| 2007/0083563 A1* | 4/2007 | Souder | G06F 17/30575 |
| 2007/0100912 A1 | 5/2007 | Pareek et al. | |
| 2007/0244918 A1 | 10/2007 | Lee et al. | |
| 2008/0016123 A1 | 1/2008 | Devraj et al. | |
| 2008/0208820 A1 | 8/2008 | Usey | |
| 2009/0282203 A1 | 11/2009 | Haustein | |
| 2010/0318570 A1 | 12/2010 | Narasinghanallur et al. | |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0126197 A1 | 5/2011 | Larsen et al. | |
| 2011/0307450 A1 | 12/2011 | Hahn et al. | |
| 2012/0109926 A1 | 5/2012 | Novik et al. | |
| 2012/0173717 A1 | 7/2012 | Kohli | |
| 2012/0284228 A1 | 11/2012 | Ghosh | |
| 2012/0284544 A1 | 11/2012 | Xian | |
| 2012/0287282 A1 | 11/2012 | Lu | |
| 2012/0323849 A1 | 12/2012 | Garin | |
| 2013/0085742 A1 | 4/2013 | Baker et al. | |
| 2013/0117237 A1 | 5/2013 | Thomsen et al. | |
| 2013/0198133 A1 | 8/2013 | Lee | |
| 2013/0212068 A1 | 8/2013 | Talius et al. | |
| 2014/0095452 A1 | 4/2014 | Lee et al. | |
| 2014/0095530 A1 | 4/2014 | Lee et al. | |
| 2014/0095546 A1 | 4/2014 | Kruglikov et al. | |
| 2014/0164331 A1 | 6/2014 | Li et al. | |
| 2014/0188804 A1 | 7/2014 | Gokhale | |
| 2014/0258241 A1 | 9/2014 | Chen | |
| 2015/0120659 A1 | 4/2015 | Srivastava | |
| 2015/0120780 A1 | 4/2015 | Jain | |
| 2015/0254240 A1 | 9/2015 | Li et al. | |
| 2015/0370641 A1 | 12/2015 | Susairaj | |
| 2016/0188621 A1 | 6/2016 | Karinta et al. | |
| 2016/0352836 A1 | 12/2016 | Kamalakantha | |
| 2017/0048314 A1 | 2/2017 | Aerdts | |
| 2017/0116207 A1 | 4/2017 | Lee | |
| 2017/0116213 A1 | 4/2017 | Jain | |
| 2017/0116298 A1 | 4/2017 | Ravipati | |
| 2017/0315877 A1* | 11/2017 | Kaplingat | G06F 11/1458 |
| 2019/0102384 A1 | 4/2019 | Hung et al. | |
| 2019/0102411 A1 | 4/2019 | Hung et al. | |

OTHER PUBLICATIONS

Preimesberger, Chris, "Oracle Profits Up, but Revenues Slip" Oracle, dated Sep. 20, 2012, 2 pages.

Oracle Base, Multitenant: Create and Configure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Zisman et al., "An approach to interoperation between autonomous database systems", Distrib. Syst. Engng 6 (1999) 135-148. Printed in the UK, 15 pages.

Weishar et al., "An Intelligent Heterogeneous Autonomous Database Architecture for Semantic Heterogeneity Support", IEEE Workshop on Interoperability in Multidatabase Systems, dated Apr. 1991, 9 pgs.

Rodd et al., "Adaptive Tuning Algorithm for Performance tuning of Database Management System", (IJCSIS) International Journal of Computer Science Information Security,vol. 8, No. 1, Apr. 2010, 4pgs.

Pavlo, "Self-Driving Database Management Systems", 8th Biennial Conference on Innovative Data Systems Research (CIDR '17), Jan. 8-11, 2017 , Chaminade, California, USA, 6 pages.

Maenhaut et al., "Design and Evaluation of a Hierarchical Multi-Tenant Data Management Framework for Cloud Applications", dated 2015, 6 pages.

Das et al., "Scalable and Elastic Transactional Data Stores for Cloud Computing Platforms", dated Dec. 2011, 302 pages.

Das et al., "Automated Demand-Driven Resource Scaling in Relational Database-as-aService", SIGMOD'16, Jun. 26-Jul. 1, 2016, San Francisco, CA, USA, 12 pages.

Beschastnikh et al., "Machine Learning for Automatic Physical DBMS Tuning", dated Dec. 6, 2007, 6 pages.

(56) References Cited

OTHER PUBLICATIONS

Agrawal et al., "Database Scalability, Elasticity, and Autonomy in the Cloud", dated 2011, 14 pages.
Susairaj, U.S. Appl. No. 15/266,340, filed Sep. 15, 2016, Final Office Action, dated Mar. 26, 2019.
Shanthaveerappa, U.S. Appl. No. 15/244,867, filed Aug. 23, 2016, Notice of Allowance, dated Apr. 4, 2019.
Shanthaveerappa, U.S. Appl. No. 15/244,867, filed Aug. 23, 2016, Interview Summary, dated Mar. 14, 2019.
Ravipati, U.S. Appl. No. 15/215,443, filed Jul. 20, 2016, Final Office Action, dated Mar. 11, 2019.
Lee, U.S. Appl. No. 15/215,446, filed Jul. 20, 2016, Interview Summary, dated May 3, 2019.
Lee, U.S. Appl. No. 15/215,446, filed Jul. 20, 2016, Final Office Action, dated Mar. 12, 2019.
Jain, U.S. Appl. No. 15/093,506, filed Apr. 7, 2016, Office Action, dated Mar. 20, 2019.
Urbano Randy et al., "Oracle Database Administrator's Guide", 12c Release dated Jul. 31, 2017, pp. 1-1500.
Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.
Ravipati, U.S. Appl. No. 15/215,443, filed Jul. 20, 2016, Advisory Action, dated Jun. 5, 2019.
Lee, U.S. Appl. No. 15/215,446, filed Jul. 20, 2016, Advisory Action, dated Jun. 4, 2019.
Sata's DBA Blog: "Oracle Statistics", dated Jan. 3, 2013, http://satya-dba.blogspot.com/2010/06/oracle-database-statistics-rbo-cbo.html, 14 pages.
Oracle White Paper Database Live Migration with Oracle Multitenant and the Oracle Universal Connection Pool on Oracle Real Application Clusters (RAC), dated Oct. 15, 2014, 13 pages.
Ravipati, U.S. Appl. No. 15/215,443, filed Jul. 20, 2016, Office Action, dated Jul. 18, 2019.
Jain, U.S. Appl. No. 15/093,506, filed Apr. 7, 2016, Interview Summary, dated Jul. 8, 2019.
Susairaj, U.S. Appl. No. 15/266,340, filed Sep. 15, 2016, Interview Summary, dated Jan. 3, 2019.
Shanthaveerappa, U.S. Appl. No. 15/244,867, filed Aug. 23, 2016, Final Office Action, dated Jan. 24, 2019.
Ravipati, U.S. Appl. No. 15/215,443, filed Jul. 20, 2016, Interview Summary, dated Jan. 4, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Shanthaveerappa, U.S. Appl. No. 15/244,867, filed Aug. 23, 2016, Office Action, dated Jun. 28, 2018.
Kruglikov, U.S. Appl. No. 15/266,902, filed Sep. 15, 2016, Office Action, dated Aug. 6, 2018.
Susairaj, U.S. Appl. No. 15/226,340, filed Sep. 15, 2016, Office Action, dated Oct. 30, 2018.
Shanthaveerappa, U.S. Appl. No. 15/244,867, filed Aug. 23, 2016, Interview Summary, dated Oct. 30, 2018.
Lee, U.S. Appl. No. 15/215,446, filed Jul. 20, 2016, Restrcition Requirement, dated Oct. 1, 2018.
Lee, U.S. Appl. No. 15/215,446, filed Jul. 20, 2016, Office Action, dated Nov. 16, 2018.
Kruglikov, U.S. Appl. No. 15/266,902, filed Sep. 15, 2016, Interview Summary, dated Oct. 1, 2018.
U.S. Appl. No. 14/202,091, filed Mar. 10, 2014, Notice of Allowance, dated Feb. 26, 2016.
U.S. Appl. No. 13/830,349, filed Mar. 14, 2013, Office Action, dated Nov. 5, 2014.
U.S. Appl. No. 13/830,349, filed Mar. 14, 2013, Notice of Allowance, dated Oct. 19, 2015.
U.S. Appl. No. 13/830,349, filed Mar. 14, 2013, Interview Summary, dated Mar. 9, 2015.
U.S. Appl. No. 13/830,349, filed Mar. 14, 2013, Final Office Action, dated Jun. 2, 2015.
U.S. Appl. No. 13/631,815, filed Sep. 28, 2012, Office Action, dated Nov. 6, 2014.
U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Hung, U.S. Appl. No. 16/135,769, filed Sep. 19, 2018, Office Action, dated Mar. 12, 2020.
Ravipati, U.S. Appl. No. 15/215,443, filed Jul. 20, 2016, Office Action, dated May 6, 2020.

\* cited by examiner

TRANSPORTABLE BACKUPS FOR PLUGGABLE DATABASE RELOCATION

CROSS-REFERENCE TO RELATED APPLICATIONS

This application claims the benefit of Provisional Appln. 62/245,937, filed Oct. 23, 2015, the entire contents of which is hereby incorporated by reference for all purposes as if fully set forth herein. This application is related to the following applications, each of which is incorporated by reference as if fully set forth herein:
  application Ser. No. 13/631,815, filed Sep. 28, 2012, titled "Container Database";
  U.S. Pat. No. 9,298,564, filed Mar. 14, 2013, titled "In Place Point-In-Time Recovery Of Pluggable Databases";
  application Ser. No. 14/202,091, filed Mar. 10, 2014, titled "Instantaneous Unplug Of Pluggable Database From One Container Database And Plug Into Another Container Database";
  application Ser. No. 15/093,506, filed Apr. 7, 2016, titled "Migrating A Pluggable Database Between Database Server Instances With Minimal Impact To Performance";
  application Ser. No. 15/215,443, filed Jul. 20, 2016, titled "Techniques For Keeping A Copy Of A Pluggable Database Up To Date With A Source Pluggable Database In Read-Write Mode"; and
  application Ser. No. 15/215,446, filed Jul. 20, 2016 titled "Near-zero Downtime Relocation of a Pluggable Database across Container Databases".

FIELD OF THE DISCLOSURE

This disclosure relates to database restoration for multitenant database systems. Techniques are presented for creating a backup of a source pluggable database of a source container database and porting the backup for recovery into a different target container database.

BACKGROUND

Database consolidation involves distributing and sharing computing resources among multiple databases managed by one or more database servers of database management systems (DBMS). Databases may be consolidated using a container DBMS. A consolidated database, such as a multitenant container database (CDB), includes one or more pluggable databases (PDBs). In a container DBMS, each pluggable database may be opened or closed in the container database independently from other pluggable databases.

Pluggable databases may be "plugged in" to a container database, and may be transported between database servers and/or DBMSs. The container DBMS may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

One of the big advantages of the container database architecture is the ability to provision new databases quickly. However, in order to clone a particular source PDB, the source PDB generally needs to be in read-only mode. In read-only mode, write operations are prohibited and, as such, the work that can be performed on the source PDB in read-only mode is severely limited. Thus, the requirement for a source PDB to be in read-only mode throughout the potentially significant duration of a cloning operation can generate similarly significant downtime for the source PDB. For example, copying files for a terabyte-sized PDB over a network can take days, during which no write operations may be performed on the source PDB that is required to be in read-only mode for the cloning operation.

One way to clone a PDB is by using third party tools. However, since third-party tools are not native to the database, such tools do not have access to many optimizations that are available natively in many databases. Furthermore, it takes effort for database administrators to configure third-party tools to enable them to work with (and clone) data from a given CDB. As such, working with third-party tools to perform cloning operations on PDBs significantly increases the database provisioning costs and slows down application development that requires PDB cloning.

Moving a PDB between container databases presents many of the same problems as cloning a PDB. For example, moving the data for a PDB from a source CDB to a destination CDB can take a significant amount of time (i.e., on the order of days for very large PDBs). It is also costly to make a PDB unavailable for the duration of moving the PDB. Also, relocating a PDB to a destination CDB can be disruptive to users that use data from the PDB at the source CDB.

Generally, moving the files for a PDB between container DBMSs may be accomplished in multiple ways, including: copying the files to an external hard drive and physically moving the hard drive to the location of the destination storage, setting up an auxiliary DBMS that leverages replication to synchronize changes across container databases, and live migration of virtual machines from one physical server to another.

Tablespace files and a data dictionary store may be moved between environments of container DBMSs using readily available mechanisms for copying and moving files. The tablespace files, along with one or more dictionary files, are referred to herein collectively as a transportable database package or an unplugged pluggable database. That is, an unplugged pluggable database may be used as a logical cartridge of content that may be plugged into one or more container databases to create or replace a pluggable database within any container database.

Once the transportable database package of a pluggable database is moved to the environment of the target container DBMS, the pluggable database can be plugged into the target container DBMS. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating a root database dictionary to define the pluggable database, such updates including, for example, adding a record to a metadata table.

The isolation provided by a container DBMS means that data corruption, such as caused by a crash (catastrophic hardware or software failure), may be limited to one or few pluggable databases. As such, a mechanism is needed to restore an individual pluggable database.

Furthermore, container databases readily accept installations of pluggable databases, which encourages distributed deployment, replication, horizontal scaling, and bulk deployment throughout a cluster. As such, pluggable databases may benefit from a content format that is reusable, even though locally unique identifiers are not reusable between different container databases.

One data source for recovery operations is a redo log, which consists of two or more pre-allocated files that store changes made to a database as they occur. Each instance of a pluggable database has an associated redo log to protect the database in case of an instance failure.

Redo log files are filled with redo records. A redo record, also called a redo entry, is made up of a group of change vectors, each of which is a description of a change made to a data block in the database. For example, changing a salary value in an employee table may generate a redo record containing change vectors that describe changes to a data block for a table. A redo record represents a database write, regardless of whether the enclosing transaction of the write has or has not been committed. Each log file of a database is uniquely identified by its log sequence number. During crash, instance, or media recovery, the database properly applies redo log files in ascending order by using the log sequence number of the involved redo log files.

Furthermore, a database backup may be created from an individual pluggable database. A database backup may later be used to restore the database in an emergency or to revert to a known point in the past. However, a detailed inventory of available pluggable database backups is typically accessible only by the DBMS of the container database that produced the pluggable database backup.

Use of a pluggable database backup or redo log is typically unsupported within a different container database. This can be a significant obstacle to preserving the long-term utility of pluggable database backups. For example, a DBMS may support relocation of a pluggable database from a dedicated host computer to a compute cloud or vice versa. However, because new identifiers (e.g. file numbers) may be automatically assigned during the relocation, backups made before the relocation may be inoperable after the relocation.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Example Computer System
      2.1 Pluggable Database
      2.2 Backup Creation
      2.3 Unplugged Pluggable Database Creation
      2.4 Plugging In
      2.5 Backup Metadata
      2.6 Backup Availability
      2.7 Metadata Export
   3.0 Restoration Process
   4.0 Redo Replay
   5.0 Replay Process
      5.1 Identifier Translation
      5.2 Recovery Mechanics
      5.3 Metadata Portability
   6.0 Hardware Overview 1.0 General Overview Techniques are provided for creating a backup of a source pluggable database of a source container database and porting the backup for recovery into a different target container database. In an embodiment, a source database server retrieves, for backups of a source pluggable database, metadata that contains information necessary to describe and/or locate backups, as well as information necessary to replay changes against backups of source pluggable database. The source database server inserts, into the source pluggable database, the metadata that describes the backups. Unplugging the source pluggable database may automatically move those metadata into the unplugged pluggable database. Later, the unplugged pluggable database may be plugged into the target container database to create or replace a target pluggable database. A target database server transfers the metadata that describes the backups from the unplugged pluggable database into the target container database. Eventually, a data file corruption may strike the target pluggable database. Based on at least one backup and the metadata that describes the backups, the target database server restores the target pluggable database within the target container database.

In an embodiment, redo metadata that describes redo logs of the source pluggable database is inserted into the unplugged pluggable database. In an embodiment, identifiers contained within the redo logs are translated into new identifiers for the target pluggable database. In an embodiment, the target database server analyzes the redo metadata to detect which redo log files and which portions of them to replay.

2.0 Example Computer System

Figure 1:
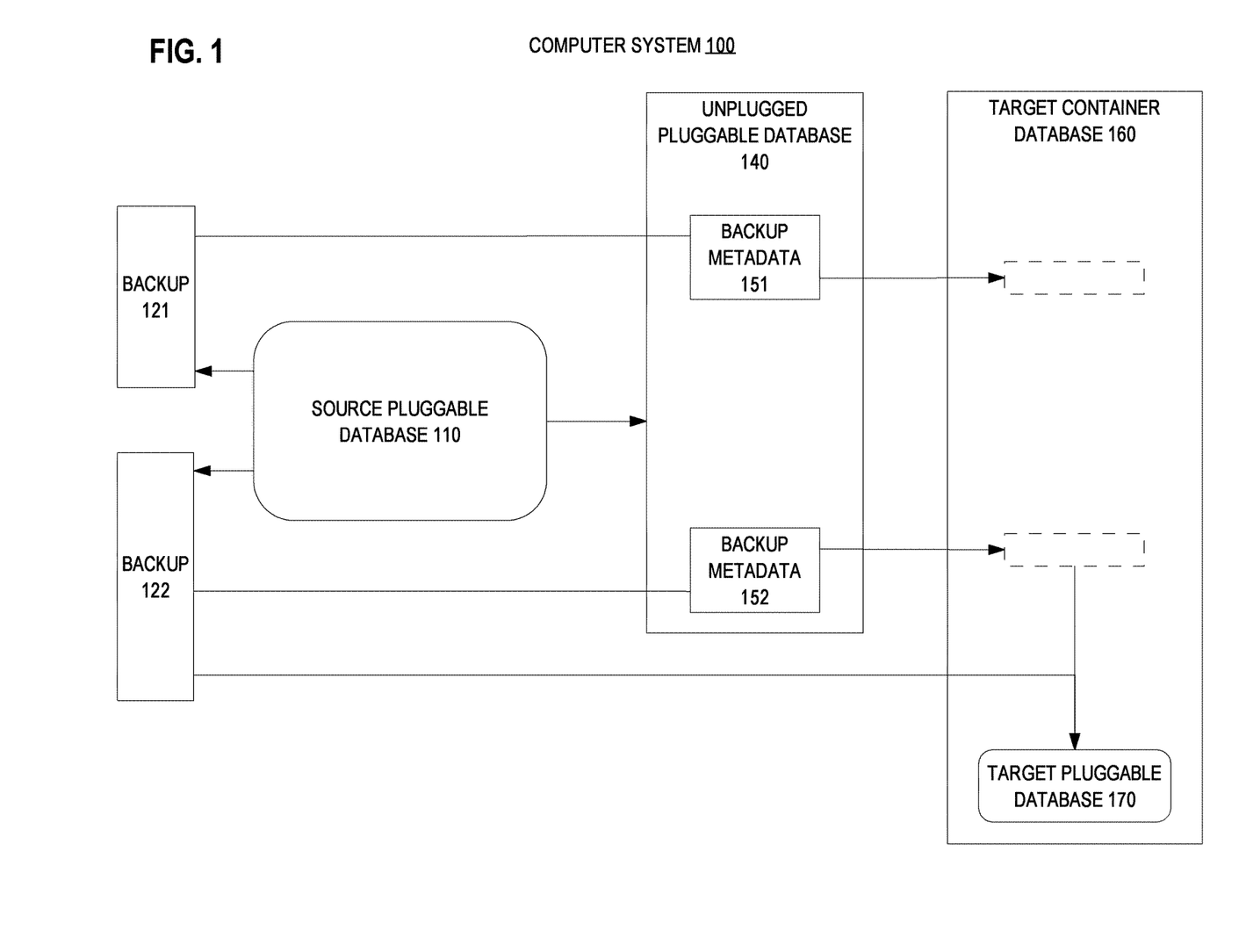
FIG. 1 is a block diagram that depicts an example computer system that creates a backup of a source pluggable database of a source container database and ports the backup for recovery into a different target container database, in an embodiment.

FIG. 1 is a block diagram that depicts an example computer system 100, in an embodiment. Computer system 100 creates a backup of a source pluggable database of a source container database and ports the backup for recovery into a different target container database.

Computer system 100 may be composed of one or more computers, including rack servers such as blades, personal computers, mainframes, network appliances, virtual machines, or other computing devices. Computer system 100 may access data that is stored in memory, on disks, or over a network.

2.1 Pluggable Database

Although not shown, computer system 100 hosts a source database server and a target database server, both of which may be a same database server or different database servers. Both source and target database servers include a container database, such as 160.

2.2 Backup Creation

Initially, target container database 160 may include zero or more pluggable databases, such as 170. Initially, the source container database includes at least one pluggable database, such as 110.

Source pluggable database 110 contains contents, which may include data and metadata. Repeatedly and at arbitrary or regular times, a backup of source pluggable database 110 may be manually or automatically created and saved, such as backups 121-122. For example, the source database server may receive and execute a command to immediately create a backup of source pluggable database 110 or a command to schedule periodic automatic backup creation.

Each of backups 121-122 is a full backup instead of an incremental backup. That is, either of backups 121-122, by itself, contains sufficient data to completely populate a pluggable database so that it contains a copy of the contents as when the backup was created.

In an embodiment, backup 121 may be a full backup, and backup 122 may be an incremental backup that defines a delta (differential) of changes that occurred to source pluggable database 110 between the creation of backups 121-122.

Using a backup to populate a pluggable database may occur during restoration or creation of the pluggable database. For example, source pluggable database 110 may need restoration after a corruption. In another example, the backup can be used to create a new pluggable database that is a clone of source pluggable database 110, either within the same source container database or within a different container database, such as 160.

However, backups may have limitations. For example because backups are full instead of incremental, keeping backups may exhaust durable storage.

For example, source pluggable database 110 may be huge, on the order of terabytes. Backup footprint may be aggravated by backup granularity.

For example, frequent backups of a whole container database (including all of its pluggable databases) may present an unsustainable demand for storage space or maintenance time. Whereas, frequent backups of an individual pluggable database may be sustainable.

In an embodiment, backup 121 may be a backup of the entire source container database, including all of its pluggable databases. In an embodiment, a pluggable database may be restored from a backup of the entire source container database, without disturbing other pluggable databases that also occupy the source container database and the backup.

Although rolling retention (deleting all but the most recent few backups) may avoid storage exhaustion, making a backup may still be slow. For example, backup 121 may be created on magnetic tape.

If storage is remote, then network or internetwork latency and retransmissions may occur. Cloud storage may increase availability and reachability of backups. However, a public cloud may have rated fees for network and storage.

Furthermore, 100 days may be needed to transfer 100 terabytes over a 100 mega-baud connection, such that a sneakernet (physical shipment on foot or by vehicle of durable removable storage media, such as a flash drive, an optical disk, or a spare internal or external magnetic drive by itself) may be competitive. As such, frequent backups may be undesirable or impossible.

For example, a full nightly backup might be a highest frequency schedule that is economically, logistically, or technically feasible. Whereas, database contents may much more rapidly evolve.

2.3 Unplugged Pluggable Database Creation

Unplugged pluggable database 140 contains copies of files that define source pluggable database 110. Unplugged pluggable database 140 may be a set of separate files or an aggregation of those files into a monolithic archive file, such as a zip file. Typically, the source database server creates unplugged pluggable database 140 by unplugging source pluggable database 110 from the source container database.

2.4 Plugging In

Unplugged pluggable database 140 may be a unit of replication for source pluggable database 110. As such, unplugged pluggable database 140 may be plugged into another container database to create a clone of source pluggable database 110.

Unplugged pluggable database 140 may be used as a logical cartridge of content that may be plugged into one or more container databases. For example, the target database server may receive and execute a command to create target pluggable database 170 within target container database 160 from unplugged pluggable database 140.

2.5 Backup Metadata

Furthermore, backups 121-122 may be opaque or otherwise not self-describing. For example, an administrator may not readily detect how old is backup 121 using information in the backup, whether backup 121 is the most recent, whether backup 121 is full or incremental, and which files are part of backup 121.

However, such descriptive details of backups 121-122 may be recorded as backup metadata within the source container database. For example, backup metadata may be stored in a control file or data dictionary of the source container database.

2.6 Backup Availability

A control file or data dictionary of the source container database may be inaccessible to the target database server that receives unplugged pluggable database 140 to plug in. For example, the source database server may be out of service during when plugging in unplugged pluggable database 140.

Alternatively, the working files of source pluggable database 110 might not be cross mounted at the target database server. For example, the working files of source pluggable database 110 may occupy a local drive to reduce latency. Whereas, the target database server may be off site.

For example, backups 121-122 (and perhaps unplugged pluggable database 140) might be the only objects whose files are accessible to the target database server. For example, backups 121-122 may occupy a public cloud.

In another example, unplugged pluggable database 140 may arrive at the data center of the target database server as an email attachment. In any case, backups 121-122 may be available to the target database server, but the backup metadata that describes backups 121-122 may occupy the source container database and not be accessible to the target database server.

2.7 Metadata Export

Even if backups 121-122 were self-describing by containing metadata, metadata accessibility may be limited. For example, transferring such metadata of backup 122 to the target database server might require transferring all of backup 122, which may have terabytes. Likewise, providing a dump (listing) of metadata of multiple backups, such as 121-122, on demand (e.g. interactive) might entail transferring all of the multiple backups.

To overcome the opacity backups 121-122, the source database server may publish the backup metadata from the source container database. For example, the backup metadata from the source container database may be included within unplugged pluggable database 140 as backup metadata 151-152.

In an embodiment, source pluggable database 110 has its own data dictionary. In an embodiment, the data dictionary of the source container database has a portion (subset of dictionary entries) that is dedicated to source pluggable database 110. The data dictionary of either of these two embodiments may contain backup metadata, for backups 121-122, which may be copied into unplugged pluggable database 140.

As such, the target database server may readily access backup metadata by receiving unplugged pluggable database 140 and reading backup metadata 151-152. For example, a comparison of backup metadata 151-152 may reveal that backup 122 is the latest backup, without actually accessing backups 121-122.

3.0 Restoration Process

Figure 2:
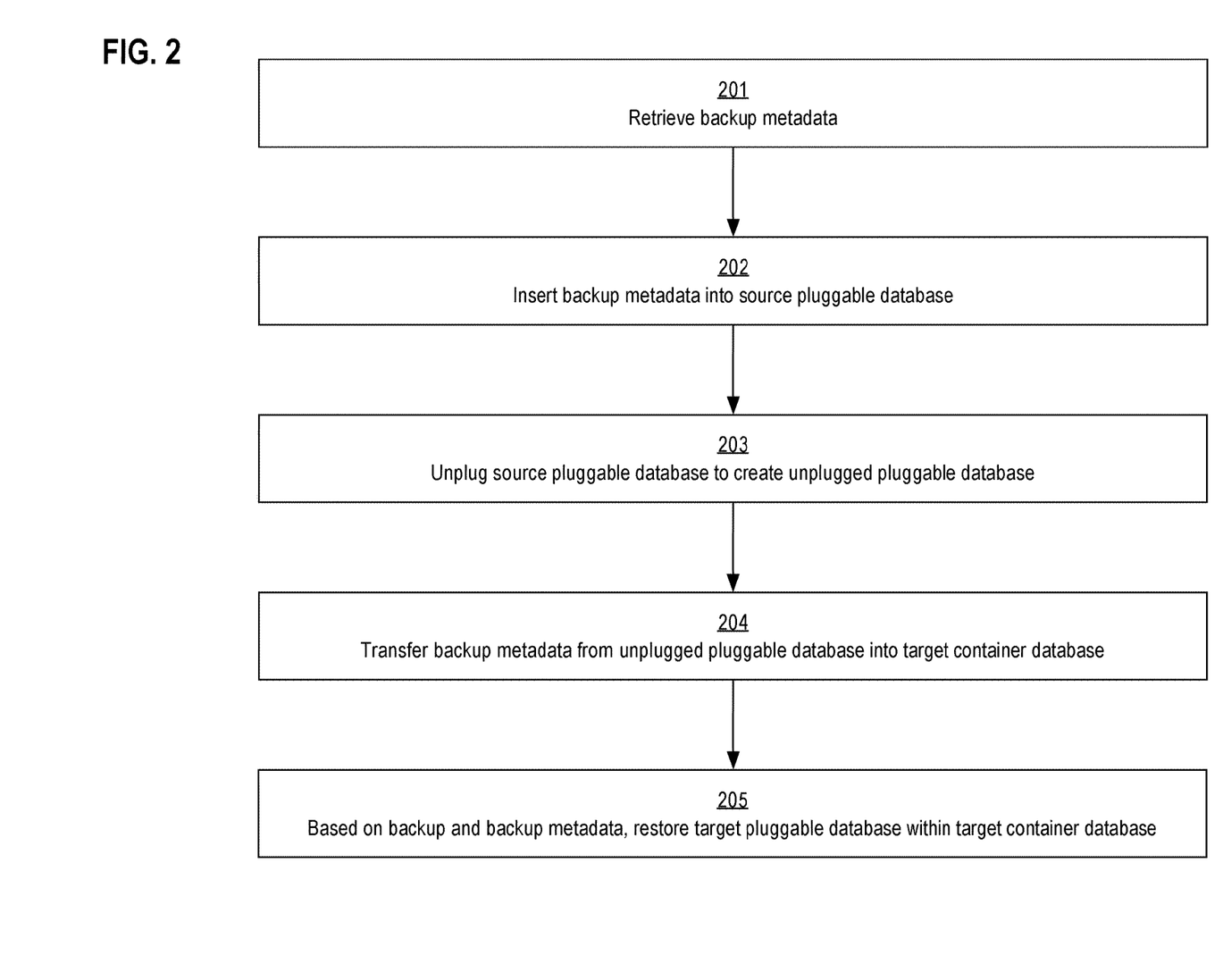
FIG. 2 is a flow diagram that depicts an example process that creates a backup of a source pluggable database of a source container database and ports the backup for recovery into a different target container database, in an embodiment.

FIG. 2 is a flow diagram that depicts an example process that creates a backup of a source pluggable database of a source container database and ports the backup for recovery into a different target container database. FIG. 2 is discussed with reference to FIG. 1.

Steps 201-203 are preparatory. They create backup 122 and unplugged pluggable database 140 from source pluggable database 110. Steps 204-205 use unplugged pluggable database 140 and backup 122 to create or replace target pluggable database 170.

In step 201 metadata that describes a plurality of backups of a source pluggable database is retrieved. For example and for reliability, an administrator may periodically create an unplugged pluggable database of source pluggable database 110 to capture the dynamic state of its contents.

For example, the source database server receives a command to create unplugged pluggable database 140 from source pluggable database 110 or from the source container database. While executing the command, the source database server exports backup metadata into unplugged pluggable database 140 from the source container database.

The source database server creates backup metadata 151-152 from backup metadata that describes backups 121-122. The source database server may retrieve the backup metadata from a control file or data dictionary of the source container database.

Steps 202-203 are related and may be performed together. In step 202, the backup metadata is inserted into the source pluggable database. For example, the source database server inserts backup metadata 151-152 into a control file of source pluggable database 110. In an embodiment and while creating unplugged pluggable database 140, the source database server includes the control file within source pluggable database 110.

In step 203, the source pluggable database is unplugged to create an unplugged pluggable database. For example, the database server receives and executes a command to unplug source pluggable database 110.

An arbitrary delay may separate steps 203-204. For example, step 203 may emit unplugged pluggable database 140, and step 204 may later use (plug into a target container database) unplugged pluggable database 140 when an administrator moves source pluggable database 110 from the source container database to target container database 160.

For example, source pluggable database 110 may outgrow a capacity of the source container database, such as processing bandwidth, network bandwidth, or disk space.

In step 204, the backup metadata is transferred from the unplugged pluggable database and into a target container database. For example, the target database server may receive and execute a command to plug unplugged pluggable database 140 into target container database 160. For example, plugging in unplugged pluggable database 140 may facilitate moving source pluggable database 110 from the source container database to target container database 160.

The command may specify one or more paths to a file or directory of unplugged pluggable database 140. For example, unplugged pluggable database 140 may occupy a public cloud or be cross mounted by the computer of the target database server.

Executing the command has two effects. First, backup metadata 151-152 are copied into a control file or data dictionary of target container database 160.

Second, target pluggable database 170 is created. For example, this may complete moving source pluggable database 110 from the source container database to target container database 160. As such, source pluggable database 110 may now be taken out of service, so long as its backups, such as 121-122, remain accessible.

After backup metadata 151-152 is transferred from unplugged pluggable database 140 into target container database 160, such metadata in target container database 160 may need augmentation with translation information. For example, plugging in unplugged pluggable database 140 may entail automatic reassignment of a unique identifier, such as a file number, to each file copied into target pluggable database 170. The backup metadata within target container database 160 may be augmented with a translation table that maps each old file number to a respective new file number.

An arbitrarily long delay may elapse between steps 203-204. For example, step 204 may be in reaction to target pluggable database 170 crashing. For example, a mean time between failure for a SCSI hard drive of the target database server may be on the order of years.

In step 204 and based on at least one backup and the metadata that describes the backup, a target pluggable database is restored into the target container database. For example, the target database server may read backup metadata 151-152 from unplugged pluggable database 140.

Based on timestamps within backup metadata 151-152, the target database server may detect that backup 122 is the most recent backup that is consistent with unplugged pluggable database 140. In an embodiment, the command specifies which of backups 121-122 to use.

From backup metadata 152, the target database server may discover which directory paths to which files are part of backup 122. For example, backup 122 may occupy a public cloud or be cross mounted by the computer of the target database server.

The target database server use information from backup metadata 151-152 and backup 122 to restore target pluggable database 170 within target container database 160. For example, the target database server may use backup 122 to initially restore target pluggable database 170 to a baseline. The target database server may use redo logs from the source container database to modify (advance) the restored baseline to recreate, within target pluggable database 170 as described below, contents as of when unplugged pluggable database 140 was made.

Faithful restoration may require replaying redo logs from the source container database. For example, the backup 122 may miss changes in source pluggable database 110 that occurred after the backup was taken.

Furthermore some time ago, target pluggable database 170 may have replaced source pluggable database 110 as the live system of record. In this case, also target pluggable database 170 usually has changes generated against target pluggable database into redo logs of target container database 160. As such, the target database server may need to replay redo logs that were made for each of pluggable databases 110 and 170.

Techniques for accessing and replaying redo logs are discussed later herein.

4.0 Redo Replay

Figure 3:
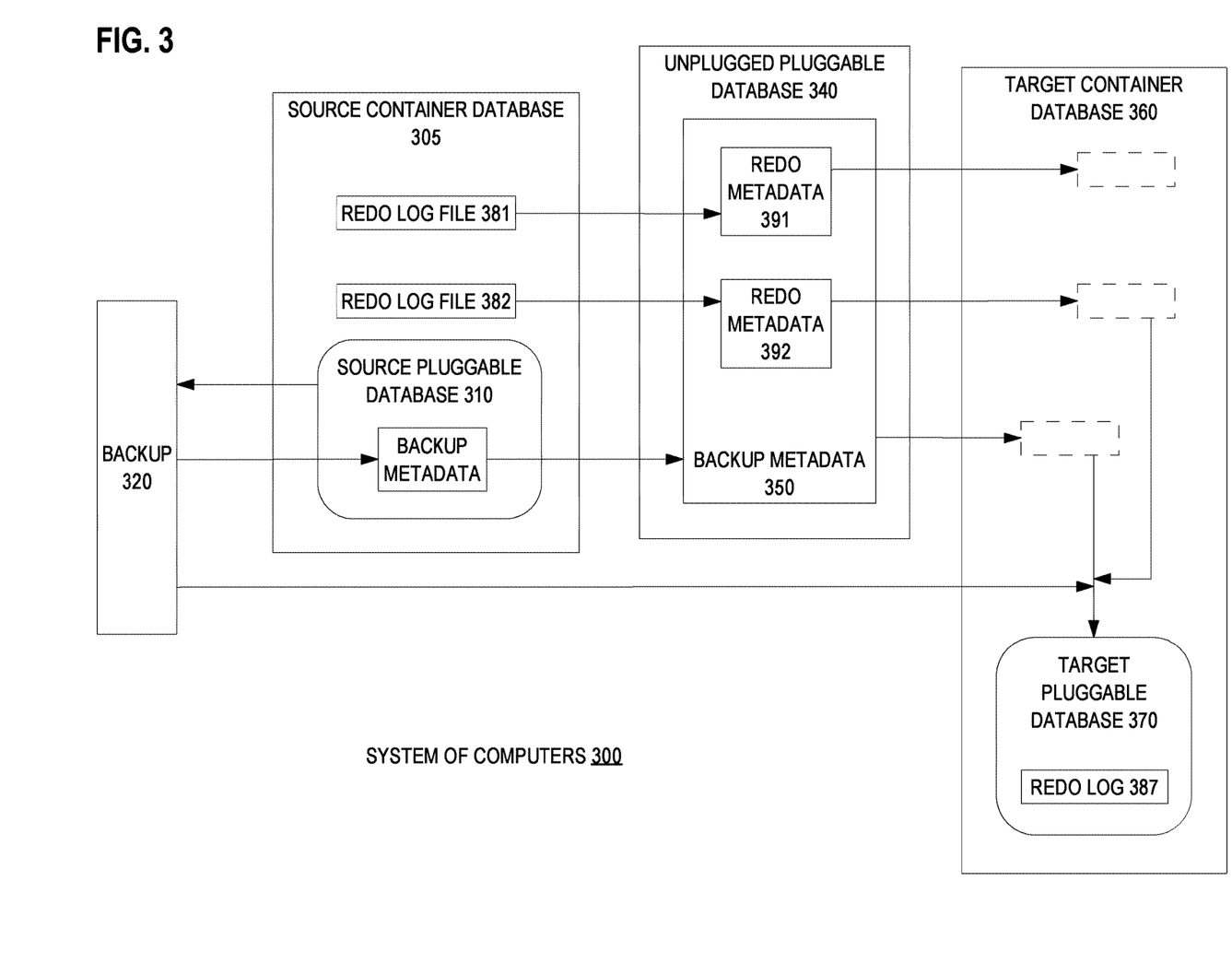
FIG. 3 is a block diagram that depicts an example computer system that provides and replays redo logs, in an embodiment.

FIG. 3 is a block diagram that depicts an example computer system 300 that provides and replays redo logs, in an embodiment. Computer system 300 may be an implementation of computer system 100.

Computer system 300 includes container databases such as 305 and 360. Source container database 305 is operated by a source database server that creates unplugged pluggable database 340 from source pluggable database 310. The source database server may automatically create a nightly backup, such as 320, of source pluggable database 310.

Growth may eventually necessitate unplugging source pluggable database 310 to begin moving it out of source container database 305 and into target container database 360. Unplugging causes immediate creation of unplugged pluggable database 340.

Unplugged pluggable database 340 contains backup metadata, such as 350, such as 320, that were created from source pluggable database 310. The source database server may unplug source pluggable database 310 in two phases. First, source pluggable database 310 may be populated with backup metadata as explained previously.

Second, unplugged pluggable database 340 may be created and populated with redo metadata, such as 391-392 within backup metadata 350, that respectively describe redo log files 381-382. Each of redo metadata 391-392 may contain a path to a redo log file and logical boundaries of the redo log file such as a time range of redo entries and a range of system control numbers (SCNs) of transactions during that time range.

Figure 4:
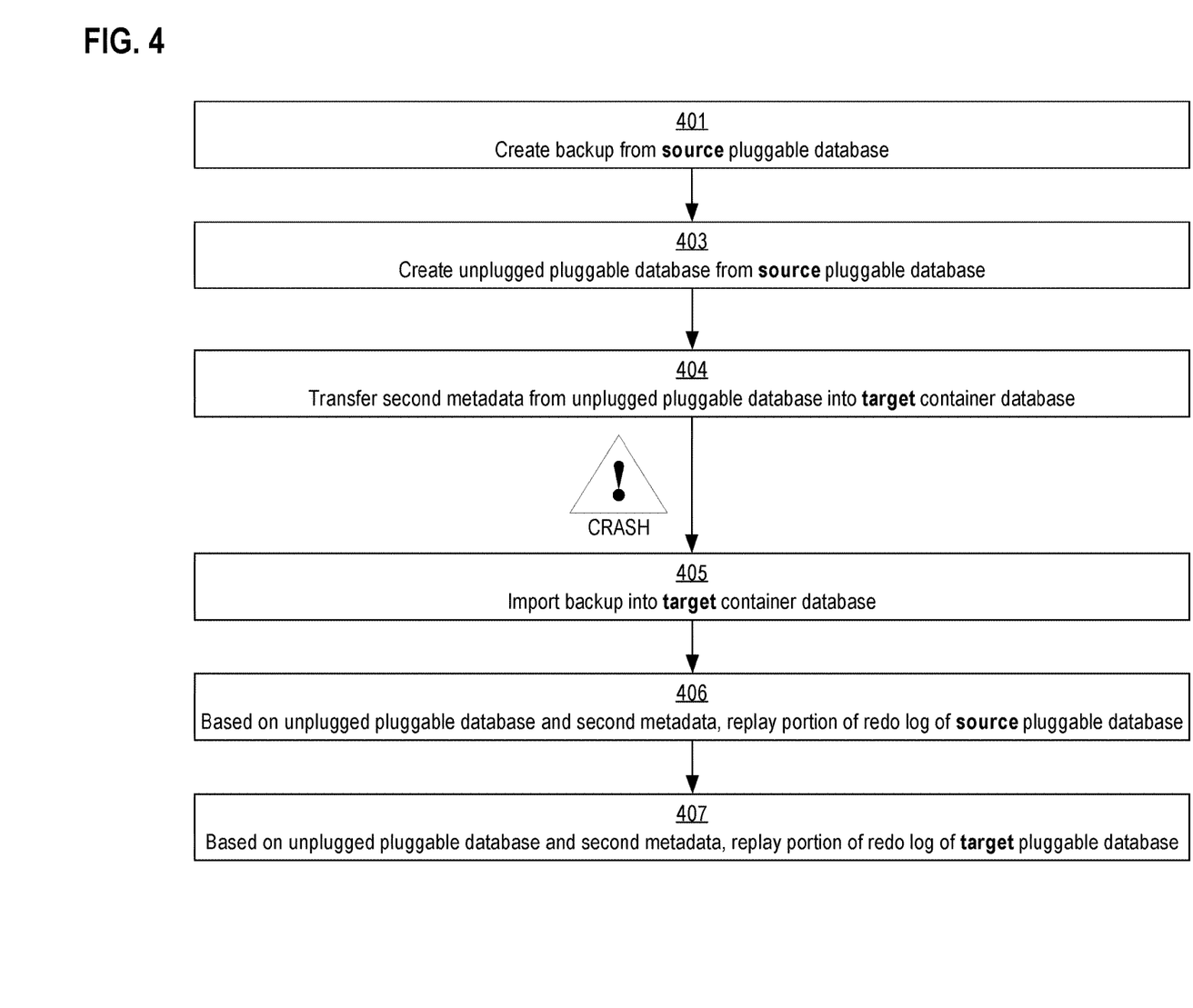
FIG. 4 is a flow diagram that depicts an example process that provides and replays redo logs, in an embodiment.

Components of FIG. 3 are explained further in FIG. 4.

5.0 Replay Process

FIG. 4 is a flow diagram that depicts an example process that provides and replays redo logs. FIG. 4 is discussed with reference to FIG. 3.

Steps 401 and 403 are preparatory. They create unplugged pluggable database 340 and backup 320 from source pluggable database 310.

In step 401, a backup is created from a source pluggable database. For example, the source database server creates backup 320 from source pluggable database 310. Details such as a file or folder path of backup 320 may be stored into the backup metadata within source pluggable database 310.

An arbitrary delay may separate steps 401 and 403. In step 403, an unplugged pluggable database is created from the source pluggable database. For example, the source database server gathers files and backup metadata of source pluggable database 310 into unplugged pluggable database 340, which in an embodiment may be a zip file. The backup metadata may describe redo logs of the source pluggable database.

By the end of step 340, unplugged pluggable database 340 is fully populated and unplugged.

In step 404, the backup metadata that may describe redo logs of the source pluggable database is transferred from the unplugged pluggable database into a target container database. For example, moving pluggable database 310 may be fulfilled by plugging unplugged pluggable database 340 into target container database 360 to create target pluggable database 370. Plugging in unplugged pluggable database 340 causes metadata 350 and 391-392 to be copied or otherwise imported into a control file or data dictionary of target container database 360 or target pluggable database 370.

5.1 Identifier Translation

Ordinary data files of a pluggable database may each be assigned a locally unique file number. Likewise, each table space may be assigned a locally unique identifier.

In an embodiment when unplugged pluggable database 340 was created, the source database server inserted into metadata of unplugged pluggable database 340 a translation table that maps unplugged pluggable database table space identifiers to unplugged pluggable database data file numbers. The target database server may reassign new identifiers for unplugged pluggable database data files and unplugged pluggable database table spaces and create other translation tables to map between unplugged pluggable database and target identifiers.

In an embodiment, a translation table is a relational table. For example, the relational table may have a key column and a value column. In an embodiment, a translation table is a hash table or other dictionary.

5.2 Recovery Mechanics

Unfortunately, a working file of target pluggable database 370 may eventually become corrupt between steps 404-405. In that case and shown as an exclamation point on FIG. 4, target pluggable database 370 may crash, and its working files may become inconsistent. Pluggable database recovery may be needed.

Recovery entails steps 405-407. Automatically or interactively, the target database server may be commanded to recover target pluggable database 370. The target database server may inspect backup metadata of target container database 360, shown as dashed boxes in FIG. 3.

The target database server may use that metadata to select and locate backup 320. In step 405, the backup is imported into the target container database. For example, the target database server may retrieve and use backup 320 and metadata already copied from unplugged pluggable database 340 to restore target pluggable database 370.

However as explained above, the redo log of each of pluggable databases 310 and 370 may need replaying into target pluggable database 370. Furthermore, the redo log of source pluggable database 310 should be replayed before the redo log of target pluggable database 370 is replayed.

One example of the information necessary for recovery to apply redo against backups properly is the information of when a tablespace is read-only. For example, a tablespace may be read-only from time year 2010, January 1, to year 2015, December 31 (i.e. a duration of five years).

Over those five years, there may be numerous backups made. Because the tablespace has been read-only throughout this time period, the backup (which has a copy of the data files of the tablespace) itself indicates that its checkpointed as of time year 2010, January 1, even if the backup itself was made in November 2015. The backup metadata should include information indicating that the tablespace (thus all its files) is read-only during the entire period, otherwise recovery using the backup may try to apply redo from year 2010 to November 2015 unnecessarily.

5.3 Metadata Portability

In step 406, based on the backup metadata maintained in the dictionary of target container database 360, the target database server replays redo changes of source container database 305 onto target container database 360 to bring the latter to a state as of the time when source pluggable database 310 was unplugged from source container database 305.

Furthermore, obstacles to plug ability may arise. For example, source and target might not agree on a same version of database server, container database, or pluggable database.

Any of these components may be independently maintained (e.g. patched). A diversity of patch levels may arise.

For example, the patch level of target pluggable database 370 may exceed that of source pluggable database 310. A component of the target such as the database server, container database, or pluggable database may have upgrade or downgrade scripts that the target database server may execute to accommodate a version mismatch.

For example plugging in unplugged pluggable database 340, importing backup 320, or replaying redo log file 382 may involve a version mismatch that the target database server may automatically detect and correct by running an upgrade script or other logic that adjusts the format of a backup, an unplugged pluggable database, or a redo log.

In step 407, the target database server applies redo changes generated by target pluggable database 370 after it was plugged into target container database 360 onto the backup (i.e. state of the backup after step 406). When step 407 finishes, target pluggable database 370 should be consistent and current, based on the redo replay of steps 406-407.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
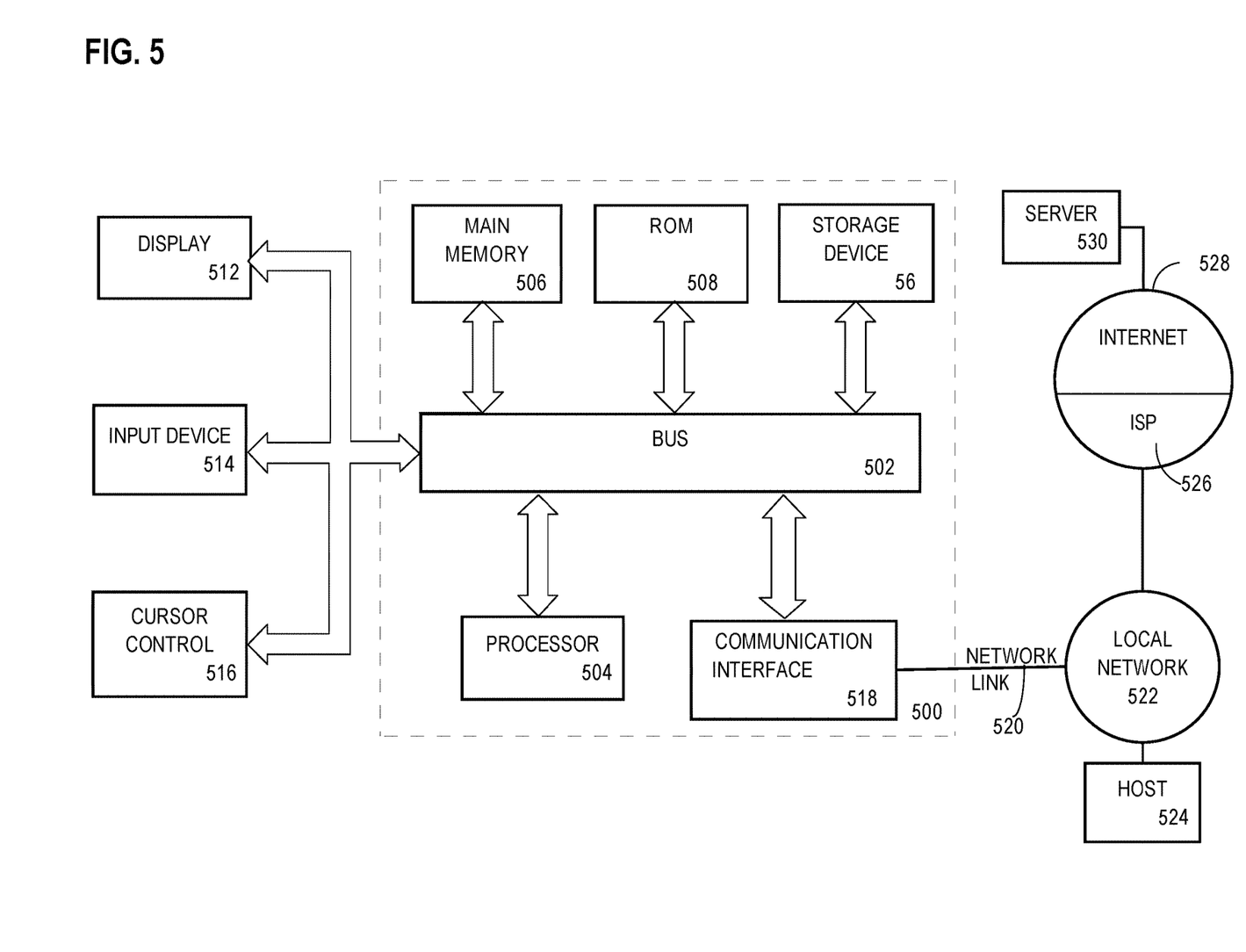
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 56, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 56. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 56. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 56 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 56, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   retrieving, a description of a plurality of backups of a source pluggable database that contains one or more datafiles and one or more tablespaces;
   unplugging the source pluggable database to create an unplugged pluggable database that contains a) the description of the plurality of backups of the source pluggable database and b) a map of the one or more tablespaces to the one or more datafiles;
   plugging the unplugged pluggable database into a target container database to create a target pluggable database,
   wherein plugging the unplugged pluggable database includes remapping, within a database dictionary of the target container database, the one or more tablespaces to the one or more datafiles using identifiers of the target pluggable database that identify tablespaces and datafiles of the target pluggable database;
   restoring, based on at least one backup of the plurality of backups, the target pluggable database of the target container database;
   wherein the method is performed by one or more computers.

2. The method of claim 1 wherein restoring the target pluggable database comprises:
   importing the at least one backup into the target container database;
   replaying, based on the unplugged pluggable database, at least a portion of a redo log of the source pluggable database;
   replaying, based on the unplugged pluggable database, at least a portion of a redo log of the target pluggable database.

3. The method of claim 2 wherein:
   the description of the plurality of backups comprises metadata that describes a plurality of redo logs of the source pluggable database; and
   the method further comprises transferring, from the unplugged pluggable database and into the target container database, the metadata that describes the plurality of redo logs of the source pluggable database;
   replaying the portion of the redo log of the source pluggable database and replaying the portion of the redo log of the target pluggable database are based on the metadata that describes the plurality of redo logs of the source pluggable database.

4. The method of claim 1 wherein:
   the map of the one or more tablespaces to the one or more datafiles associates a file of the one or more datafiles with a particular file number;
   remapping the one or more tablespaces to the one or more datafiles comprises generating a mapping that translates the particular file number into a new file number.

5. The method of claim 1 further comprising inserting, into the unplugged pluggable database, at least one of:
   metadata that describes a plurality of incarnations of the source pluggable database,
   a mapping that translates a system change number into a log sequence number, or
   a mapping that translates a table space identifier into a file identifier.

6. The method of claim 1 wherein:
   the unplugged pluggable database comprises at least one file having a respective identifier;
   said plugging the unplugged pluggable database into the target container database comprises reassigning a new respective identifier to each file of the at least one file within the target pluggable database.

7. The method of claim 6 wherein reassigning a new respective identifier to each file comprises inserting, into metadata of the target container database, a translation table that maps file identifiers of a source container database to file identifiers of the target container database.

8. The method of claim 1 wherein the source pluggable database occupies a source container database that is not the target container database.

9. The method of claim 8 wherein at least one of:
a backup format of the source container database differs from a backup format of the target container database,
an unplugged pluggable database format of the source container database differs from an unplugged pluggable database format of the target container database, or
a redo log format of the source container database differs from a redo log format of the target container database.

10. The method of claim 1 wherein said plugging the unplugged pluggable database into the target container database comprises transferring the description of the plurality of backups of the source pluggable database into the database dictionary of the target container database.

11. The method of claim 1 wherein:
said map of the one or more tablespaces to the one or more datafiles further describes a mapping of tablespace identifiers to file numbers, assigned by a database management system (DBMS), of the one or more datafiles;
said remapping the one or more tablespaces to the one or more datafiles is based on said map of the one or more tablespaces to the one or more datafiles.

12. One or more non-transitory computer-readable media storing instructions that, when executed by one or more processors, cause:
retrieving, a description of a plurality of backups of a source pluggable database that contains one or more datafiles and one or more tablespaces;
unplugging the source pluggable database to create an unplugged pluggable database that contains a) the description of the plurality of backups of the source pluggable database and b) a map of the one or more tablespaces to the one or more datafiles;
plugging the unplugged pluggable database into a target container database to create a target pluggable database,
wherein plugging the unplugged pluggable database includes remapping, within a database dictionary of the target container database, the one or more tablespaces to the one or more datafiles using identifiers of the target pluggable database that identify tablespaces and datafiles of the target pluggable database;
restoring, based on at least one backup of the plurality of backups, the target pluggable database of the target container database.

13. The one or more non-transitory computer-readable media of claim 12 wherein the instructions further cause:
importing the at least one backup into the target container database;
replaying, based on the unplugged pluggable database, at least a portion of a redo log of the source pluggable database;
replaying, based on the unplugged pluggable database, at least a portion of a redo log of the target pluggable database.

14. The one or more non-transitory computer-readable media of claim 13 wherein:
the description of the plurality of backups comprises metadata that describes a plurality of redo logs of the source pluggable database; and
the instructions further cause transferring, from the unplugged pluggable database and into the target container database, the metadata that describes the plurality of redo logs of the source pluggable database;
replaying the portion of the redo log of the source pluggable database and replaying the portion of the redo log of the target pluggable database are based on the metadata that describes the plurality of redo logs of the source pluggable database.

15. The one or more non-transitory computer-readable media of claim 12 wherein:
the map of the one or more tablespaces to the one or more datafiles associates a file of the one or more datafiles with a particular file number;
remapping the one or more tablespaces to the one or more datafiles comprises generating a mapping that translates the particular file number into a new file number.

16. The one or more non-transitory computer-readable media of claim 12 the instructions further cause inserting, into the unplugged pluggable database, at least one of:
metadata that describes a plurality of incarnations of the source pluggable database,
a mapping that translates a system change number into a log sequence number, or
a mapping that translates a table space identifier into a file identifier.

17. The one or more non-transitory computer-readable media of claim 12 wherein:
the unplugged pluggable database comprises at least one file having a respective identifier;
said plugging the unplugged pluggable database into the target container database comprises reassigning a new respective identifier to each file of the at least one file within the target pluggable database.

18. The one or more non-transitory computer-readable media of claim 17 wherein reassigning a new respective identifier to each file comprises inserting, into metadata of the target container database, a translation table that maps file identifiers of a source container database to file identifiers of the target container database.

19. The one or more non-transitory computer-readable media of claim 12 wherein the source pluggable database occupies a source container database that is not the target container database.

20. The one or more non-transitory computer-readable media of claim 19 wherein at least one of:
a backup format of the source container database differs from a backup format of the target container database,
an unplugged pluggable database format of the source container database differs from an unplugged pluggable database format of the target container database, or
a redo log format of the source container database differs from a redo log format of the target container database.

21. The one or more non-transitory computer-readable media of claim 12 wherein the plugging the unplugged pluggable database into the target container database comprises transferring the description of the plurality of backups of the source pluggable database into the database dictionary of the target container database.

* * * * *

UNITED STATES PATENT AND TRADEMARK OFFICE
CERTIFICATE OF CORRECTION

PATENT NO. : 10,789,131 B2
APPLICATION NO. : 15/254884
DATED : September 29, 2020
INVENTOR(S) : Rajamani et al.

It is certified that error appears in the above-identified patent and that said Letters Patent is hereby corrected as shown below:

On the Title Page

On page 3, Column 2, under Other Publications, Line 13, delete "Restrcition" and insert -- Restriction --, therefor.

In the Specification

In Column 6, Line 42, delete "source" and insert -- target --, therefor.

In Column 11, Line 9, delete "plug ability" and insert -- plugability --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*